United States Patent
Xia et al.

(10) Patent No.: US 9,215,006 B2
(45) Date of Patent: Dec. 15, 2015

(54) APPARATUS AND METHOD FOR EFFICIENT OPTICAL LOSS MEASUREMENT

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1268 days.

(21) Appl. No.: 12/979,734

(22) Filed: Dec. 28, 2010

(65) Prior Publication Data

US 2012/0163804 A1    Jun. 28, 2012

(51) Int. Cl.
*H04B 10/08* (2006.01)
*H04B 10/077* (2013.01)

(52) U.S. Cl.
CPC ........ *H04B 10/0771* (2013.01); *H04B 10/0775* (2013.01)

(58) Field of Classification Search
CPC . H04B 10/0775; H04B 10/0771; H04J 14/02; H04J 14/0221; G01R 21/00; G04Q 11/0005
USPC .............. 398/9–38, 58, 66, 82, 140, 141, 171
See application file for complete search history.

(56) References Cited

U.S. PATENT DOCUMENTS

| | | | | |
|---|---|---|---|---|
| 6,141,125 | A * | 10/2000 | Blair et al. | 398/32 |
| 7,809,276 | B2 * | 10/2010 | Ekkizogloy et al. | 398/139 |
| 7,860,952 | B2 * | 12/2010 | Haulin et al. | 709/220 |
| 8,149,742 | B1 * | 4/2012 | Sorsby | 370/278 |
| 8,670,673 | B2 * | 3/2014 | Eiselt | 398/170 |
| 2003/0007215 | A1 * | 1/2003 | Snawerdt | 359/152 |
| 2006/0198634 | A1 * | 9/2006 | Ofalt et al. | 398/16 |
| 2008/0008469 | A1 * | 1/2008 | Yokoyama | 398/16 |
| 2009/0129773 | A1 * | 5/2009 | Oron | 398/10 |

* cited by examiner

*Primary Examiner* — M. R. Sedighian

(57) ABSTRACT

A measurement system that includes a power source and a power meter, said power source is configured to generate both a measurement signal and a power source communication signal, and said power meter is in communication with said power source and configured to receive both said measurement signal and said power source communication signal.

23 Claims, 8 Drawing Sheets ns. These fiber links may be physically connected to an optical interface that manages each fiber link for a particular network with multiple fiber links extending on to a variety of end users. The fiber links are generally run through conduit and may be twisted through walls and bent around curves before reaching the end user. These twists and bends may result in fatigue or damage that reduce the intensity of the signal being transmitted through the line and in some cases even result in line continuity interruption, thereby creating an optical impairment or loss in the fiber link.

Testing, installation and maintenance of fiber communication networks requires equipment that may be used in the field at various locations to test the fiber links in a variety of installations and under different circumstances. Specifically, measurement of optical loss of fiber links is a common practice in a central office (CO), a point of presence (POP), co-locations, and anywhere there are fiber links for communications. Currently, the expected mechanism for measuring optical loss of a fiber link involves the use of a light source transmitter typically in the form of a handset to transmit light from one end of the link and a power meter receiver typically in the form a different handset to receive and read the light intensity at the opposite end of the link under test.

The light source transmitter and the power meter receiver both fail to provide any type of direct communications for use by technicians. Typically, the technicians, at the two opposing ends, are forced to rely on some separate external mode of communication to coordinate their actions, such as conveying directions to move to the next fiber link or to discuss a problem. The use of this external mode of communication may be difficult and time consuming. Specifically, a landline phone is not always near a fiber shelf, cellular phone signals may be poor, and the technician needs to be mobile when taking measurements and using tools, which makes holding a phone cumbersome and inconvenient.

Accordingly, there is a need in the art for providing reliable and convenient two-way communication between the light source transmitter and the power meter receiver, allowing the two devices to talk while the technicians are measuring the loss.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples set forth herein are not intended to be exhaustive or otherwise limiting or restricting to the precise form and configuration shown in the drawings and disclosed in the following detailed description. Exemplary illustrations of the present invention are described in detail by referring to the drawings as follows:

DETAILED DESCRIPTION

Figure 1:
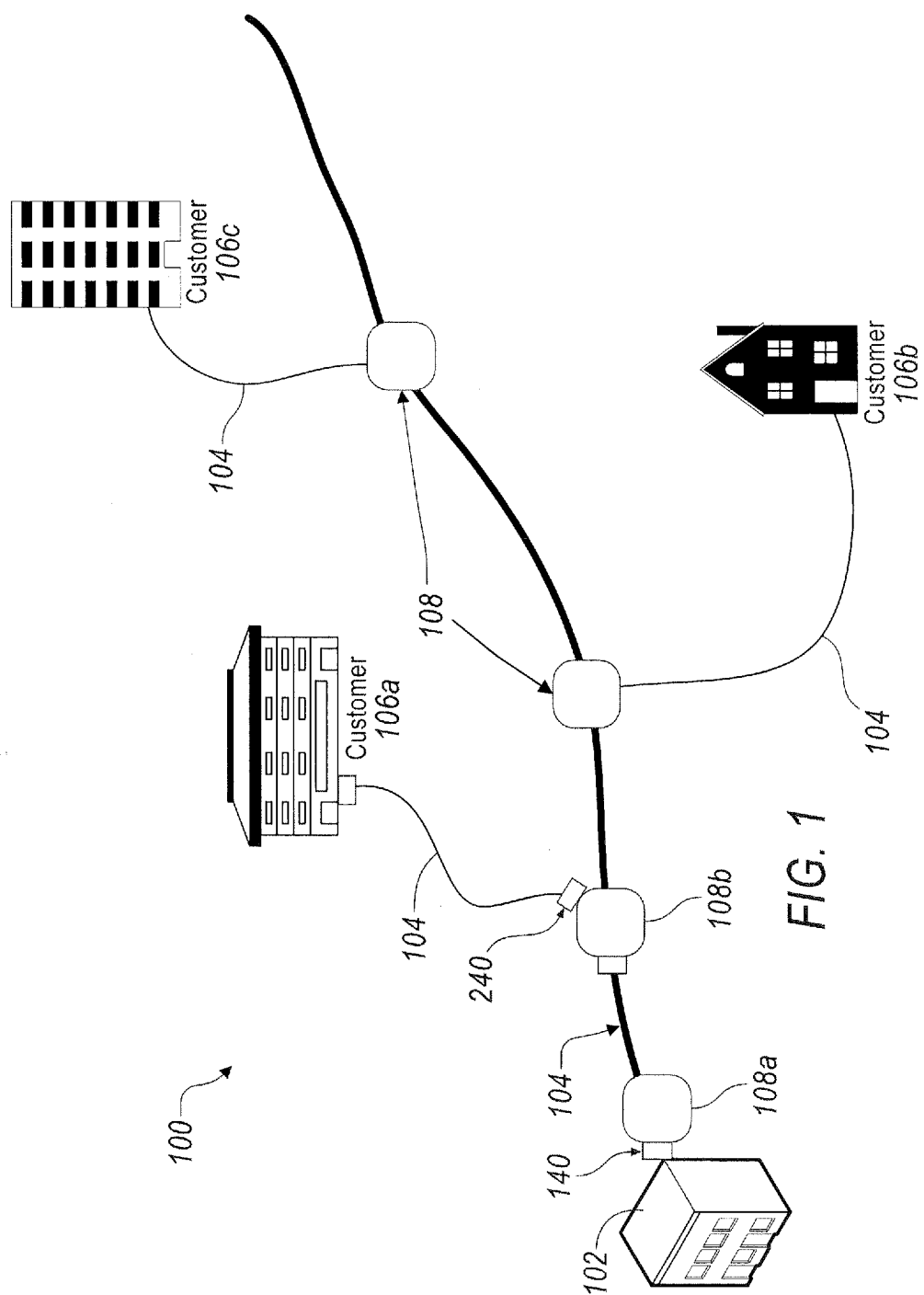
FIG. 1 illustrates an exemplary architecture of a communication network.

Various exemplary illustrations of an optical fiber link testing system, with measurement device, are disclosed for use in measuring optical fiber links. In one exemplary arrangement, the testing system may include handheld measurement devices that maintain two-way communications between technicians operating the testing system's handheld devices. An exemplary fiber link testing system may generally include at least one optical light power source selectively transmitting and receiving at least one wavelength and at least one optical light power meter transmitting and receiving at least one wavelength.

The power source and the power meter may be interconnected through at least one optical fiber link for at least one of testing the fiber link and communicating through the fiber link. In one exemplary arrangement, the power source and power meter may generally include an integrated communication system. The power source and the power meter may include wavelength division multiplexing (WDM) capabilities or may be interconnected to a wave length division multiplexer, where the capacity of the optical fiber link is increased by simultaneously sending more than one ray of light down the single fiber. The power source may include a processor and data storage capabilities. Moreover, the WDM capability enables the technician to send by way of the optical light power source both a measurement signal and a communication signal simultaneously to measure and communicate without the use of an auxiliary communication device. The power meter may include a processor and data storage capabilities for automatically receiving, measuring and storing the measurement signal, which is transmitted from the power source, as well as the communication signal. In turn, the power meter may also send a communication signal to the optical power source, which includes a receiver, to provide two-way communication between the opposing ends. Thus, both the power source and the power meter also have transmission (e.g., transmitter) and receiving (e.g., receiver) capabilities to promote two way communications.

The power source and the power meter may be interconnected through at least one optical fiber link for at least one of testing the fiber link and communicating through the fiber link. The power source and the power meter may include an output and an input for signaling between the source and the meter. The input may be of any known input for sending the communication signals, such as, but not limited to, a microphone, a push button, a toggle switch, a touch screen and a keyboard. The output may be of any known output for receiving the communication signals and translating the signal to a visual or audible indicator such as, but not limited to, an LED (light emitting diode) indicator, a display screen and a speaker for receiving the communication signals. In one exemplary approach, the technician may receive the notification of the communication signal in the form of a simple indicator light that is illuminated, indicating that the power meter has completed the measurement for the current fiber link and may send a return signal with a message of "move to the next port" to the power meter.

The optical fiber link testing system may be used in an exemplary measurement process. Specifically, the exemplary process may include a power source that may be physically connected to a power meter through at least one optical fiber link. The power source may be activated by a first technician to transmit at least one optical signal wavelength; then the power meter receives the signal and displays a readout, provided the optical fiber link is intact. A second technician may activate a switch on the power meter to transmit a second optical signal wavelength to the power source stating the progress of the measurement. Additionally, a technician may utilize the same optical fiber that is being measured to conduct two-way communication through the power source and the power meter.

An additional exemplary process may be used where the optical fiber link testing system functions in an automatic mode. When in the automatic mode, the power meter recognizes when the optical signal is sent and automatically initiates a reading. After the power meter automatically recognizes the reading is complete, a signal is automatically transmitted back to the power source to indicate to the first technician that the test is complete and it is time to move to the next fiber.

Additionally, both the power source and the power meter may be programmed to recognize when the optical fiber is not intact and to send a message to each technician informing him to go back to the last good optical fiber. Specifically, in one exemplary approach, the internal communication device beeps to tell the tech to move the meter to the next location. Generally, in the exemplary approach, the power source and the power meter include a preprogrammed, predetermined test plan that includes a specific location, such as, but not limited to, an office, rack or shelf codes and a port ID. Thus, once the test is complete, the power source or power meter transmits a signal to the opposing technician to inform him to move to a specific port next. The preprogramming may be utilized when in either the normal or manual mode, as well as the automatic mode, to automatically inform the technician to move to the next port number.

The exemplary power source device and power meter device may be used in conjunction with any network, system or device, etc., that generally employs at least one optical fiber link, wire, cable or other conduit for providing communication between any component, element of a network, system, device or the like. The power source and power meter provide a mechanism to test an optical fiber link while simultaneously allowing communication between technicians through the same test optical fiber link. Accordingly, although optical fiber link testing systems specifically described herein are illustrated as elements typically associated with optical fiber networks, they may be utilized in any system relying on wired communication between adjacent devices.

Turning now to FIG. 1, an exemplary communication system 100 is illustrated. The system 100 generally includes a central office 102 and a communication line or media 104 that provides communication signals to a plurality of customers 106. The communication line 104 may include any media configured to transmit data. In some exemplary illustrations, the communication media 104 includes optical fiber, as will be described further below. The system 100 may be in further communication with additional communications networks and/or systems (not shown), including any known types of media distribution networks, packet-switched networks, telephone networks, or the like.

The system 100 may include a plurality of component assemblies 108 associated with a corresponding plurality of customer premises 106. Each component assembly 108 generally processes a signal transmitted through the communication media 104 to provide a desired signal, e.g., optical signals, media content, or the like, to/from an associated customer premise 106. Where the system 100 includes fiber optic components or media, the component assembly 108 may include any component that is convenient for generally processing optical signals transmitted through the communication media 104 to customer(s) 106. Generally, the exemplary communication system 100 may be a wavelength-division multiplexing system (WDM). A WDM system includes different component assemblies 108, such as, but not limited to, a multiplexer, a demultiplexer or an optical amplifier. Generally, a WDM system uses the multiplexer 108a at the transmitter to join the signals together and the demultiplexer 108b at the receiver to split the signals back apart. The WDM may provide bi-directional communication for simultaneous transmission and receiving of multiple signals through the single communication media 104. The communication media 104 may be secured to each communication component assembly 108, thereby allowing transmission of signals to/from the central office 102 and customers 106.

Figure 2:
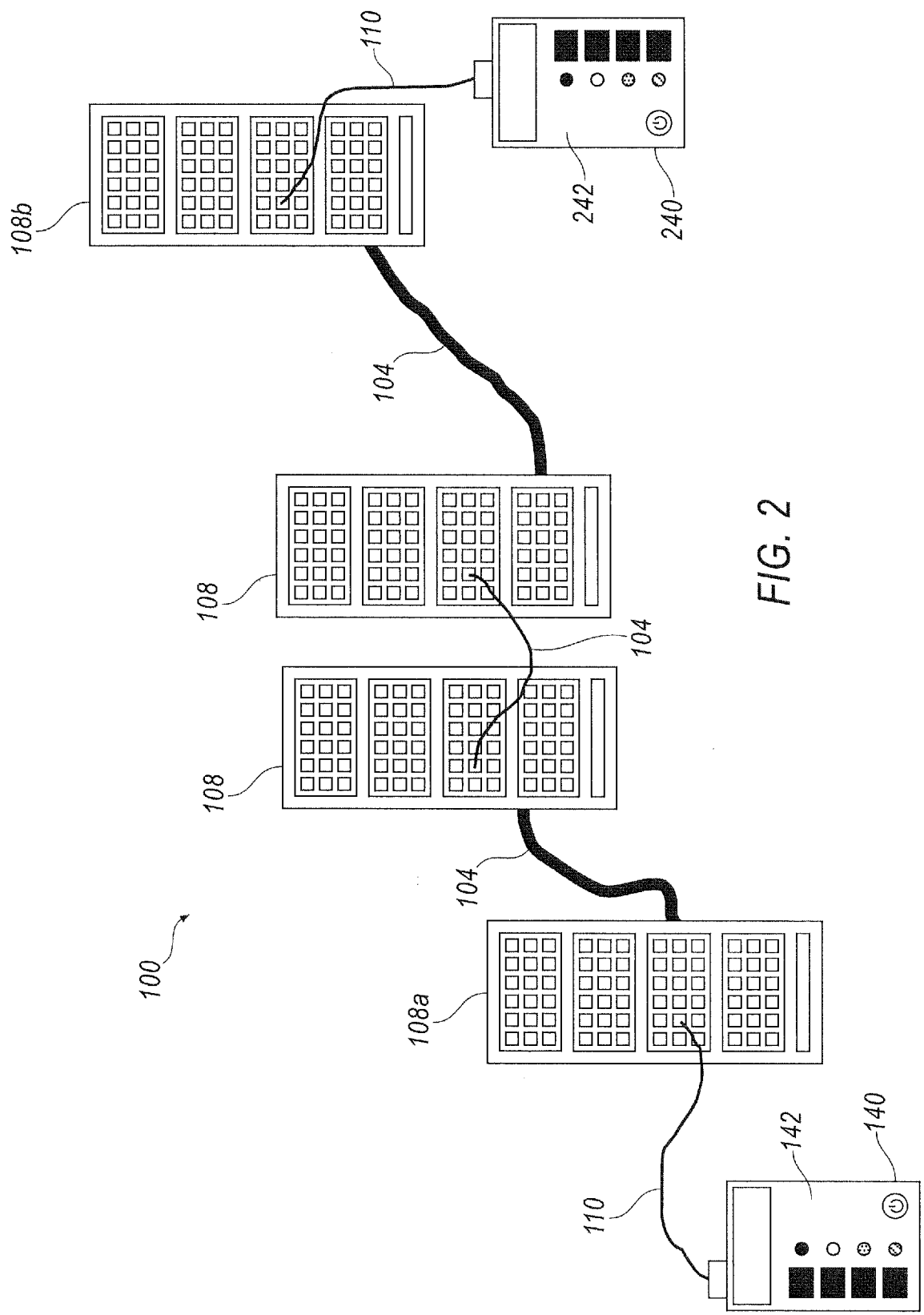
FIG. 2 illustrates an exemplary optical fiber and measurement connection.

Generally, communication systems 100 require continuous monitoring and maintenance to provide high quality signals to the customer 106. As illustrated in FIGS. 1 and 2, the exemplary communication system 100 may include various measuring devices 140, 240 that are communicatively connected to the communication media 104, which is illustrated in the exemplary system 100 as an optical fiber link 104. The measuring devices 140, 240 may be used to measure a variety of communication system properties, such as, but not limited to, optical loss measurement, optical spectral measurement, chromatic dispersion measurement, polarization mode dispersion measurement and optical signal-to-noise ratio measurement.

The measuring devices 140, 240 may be single unit handheld measuring devices that are positioned at each end of the optical fiber link 104 for at least one of providing and measuring an optical signal (not shown), or they may be separate units, one for providing the optical signal and the other for measuring the signal. Regardless of the type of handheld measuring devices 140, 240, both measuring devices 140, 240 will have the additional capability to directly communicate with the other through the optical fiber link 104, allowing the technician to have a two-way communication capability, which will be discussed in greater detail below.

As illustrated, in FIGS. 2-7, the exemplary measuring devices 140, 240 are illustrated as separate units interconnected to the component assemblies 108. The exemplary measuring device 140 is a power source, and the exemplary measuring device 240 is a power meter. However, the two measuring devices 140, 240 may be configured to include the same components and may be interchangeable. The power source measuring device 140 may be used to transmit the optical signal through the optical fiber link 104 while maintaining a two-way communication channel link (not shown), which will be discussed in greater detail below. The power meter measuring device 240 may receive and measure the optical signal strength while maintaining the two-way communication channel link (not shown) with the power source measuring device 140. Generally, the exemplary power source measuring device 140 and exemplary power meter measuring device 240 may be either directly connected to the component 108, may be connected through an optical fiber lead 110 or may be connected directly to the optical fiber link 104. The optical fiber lead 110 may provide a convenient connection between the component 108 and the handheld measuring device 140, 240 without degrading the optical strength. The optical fiber lead may allow the technician to maneuver as needed, and depending on the application, the lead 110 may not be required.

Turning to FIGS. 2 to 7, an exemplary power source measuring device 140 and exemplary power meter measuring device 240 are illustrated. The power source measuring device 140 may be a simple handheld device having a housing 142 for enclosing at least a central control microprocessor 170, an optical light source 144 providing at least a first wavelength, a button processor 146, a code generator 148, a drive circuit 150, a wavelength separator 152, a photo detector 154, a code interpreter 156, a light emitting diode (LED) driver 158 and at least one function button 160 that may include an optical transmission activation button. The power source measuring device 140 may also include an optical interface jack 162, light emitting diode (LED) indicators 164 and at least one communication button 166. The optical interface jack 162, the LED indicators 164 and the communication button 166 may all extend from any one of the exterior surfaces 168. The optical jack 162 may be a standard connector for coupling the power source measuring device 140 to the fiber lead 110 or directly to the component 108.

The power meter measuring device 240 is similar to the power source measuring device 140 in that it may include a housing 242, a central control microprocessor 270, a second optical light source 244 for providing at least a second wavelength, a processor 246, a code generator 248, a drive circuit 250, a wavelength separator 252, a photo detector 254, a code interpreter 256, an LED driver, an optical measurement detector 272, at least one function button 260 and a central control processor 270. The power meter 240 may also include the interface jack 162, the LED indicators 164 and the communication buttons 166. Both the power source measuring device 140 and the power meter measuring device 240 may include identical parts and merely act as master and slave devices depending on which technician is transmitting the test signal and which one is measuring the test signal.

Figure 3:
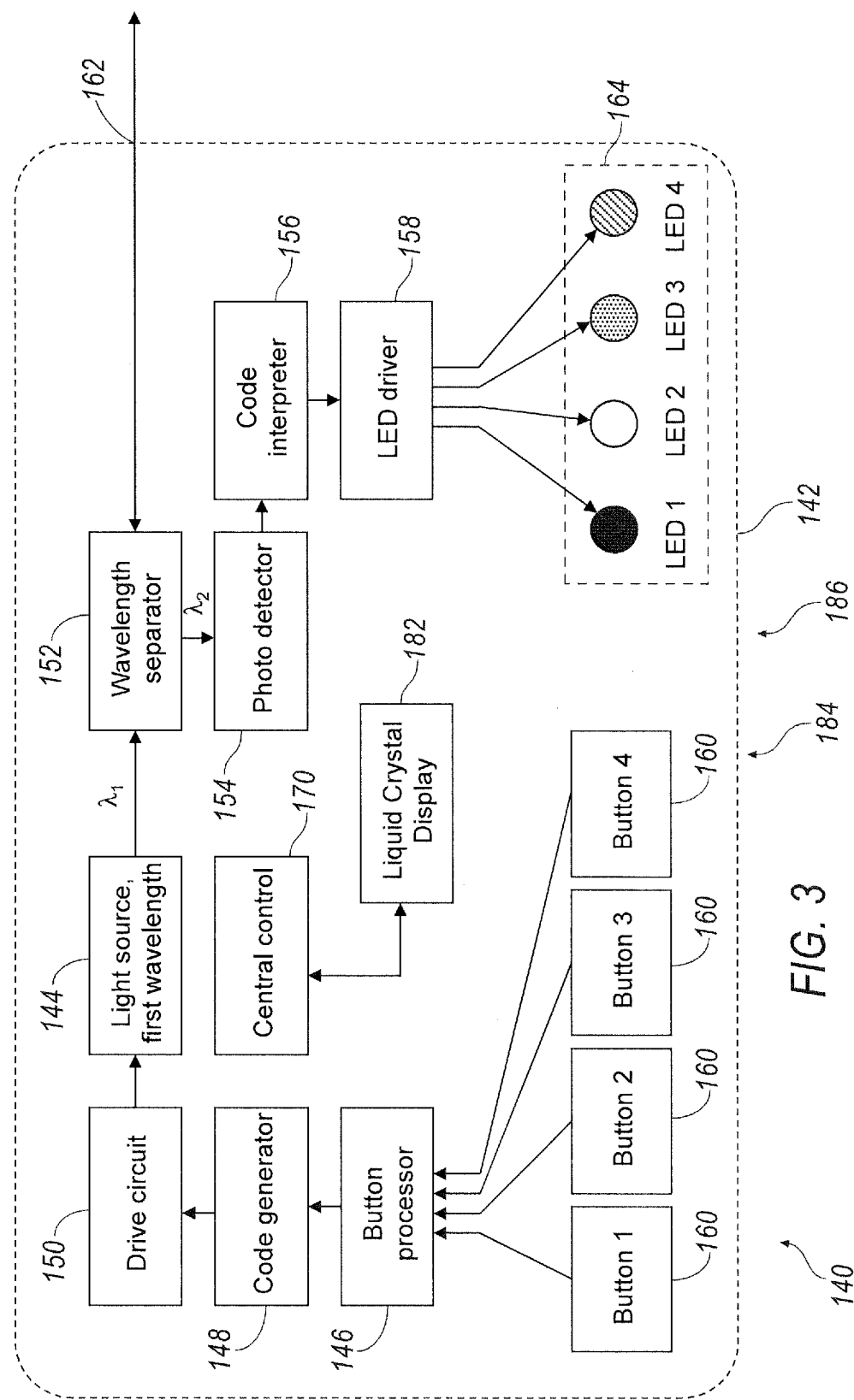
FIG. 3 illustrates an exemplary optical fiber power source with a block flow diagram of exemplary internal components.
Figure 4:
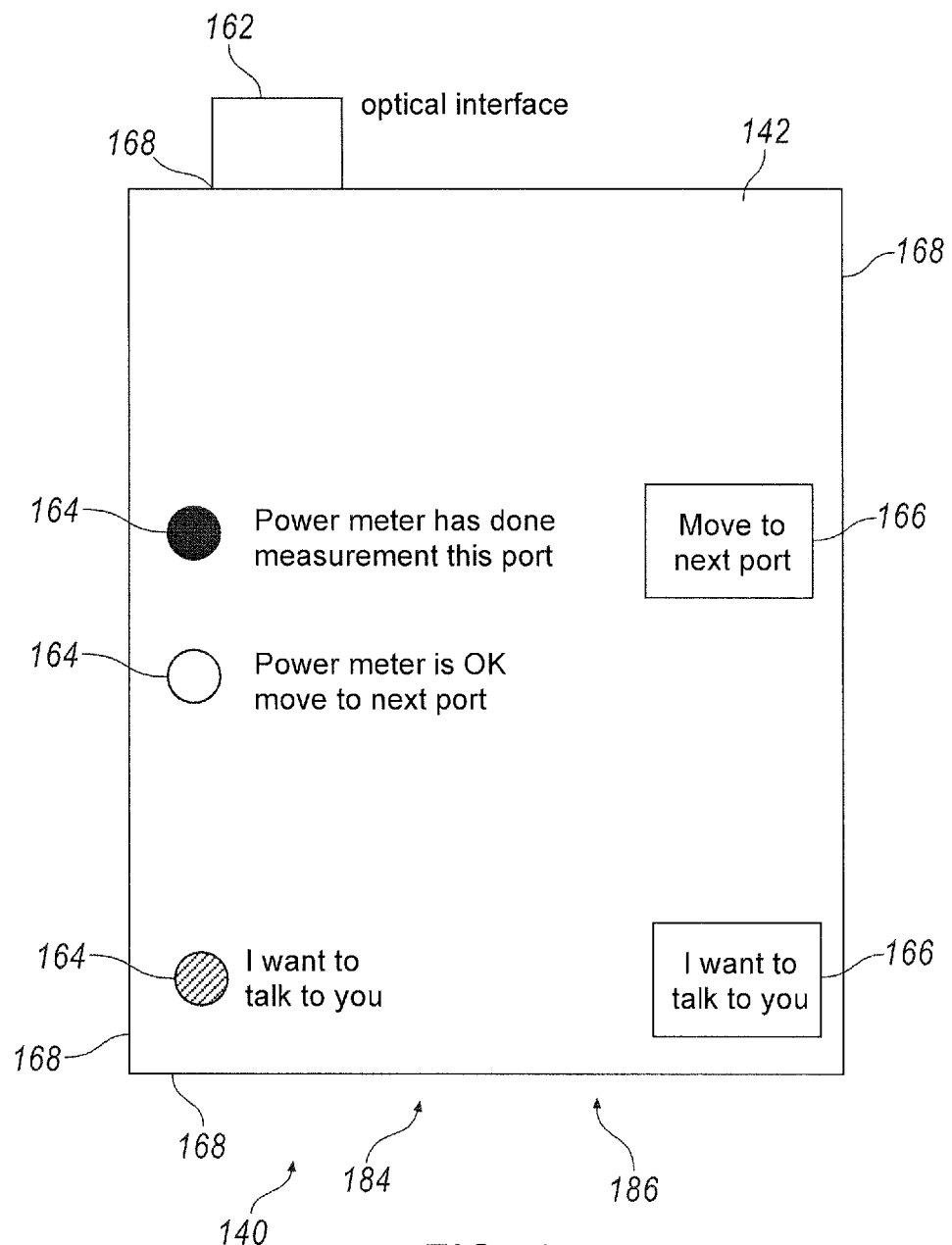
FIG. 4 illustrates an exemplary optical fiber power source with communication buttons and indicators.
Figure 5:
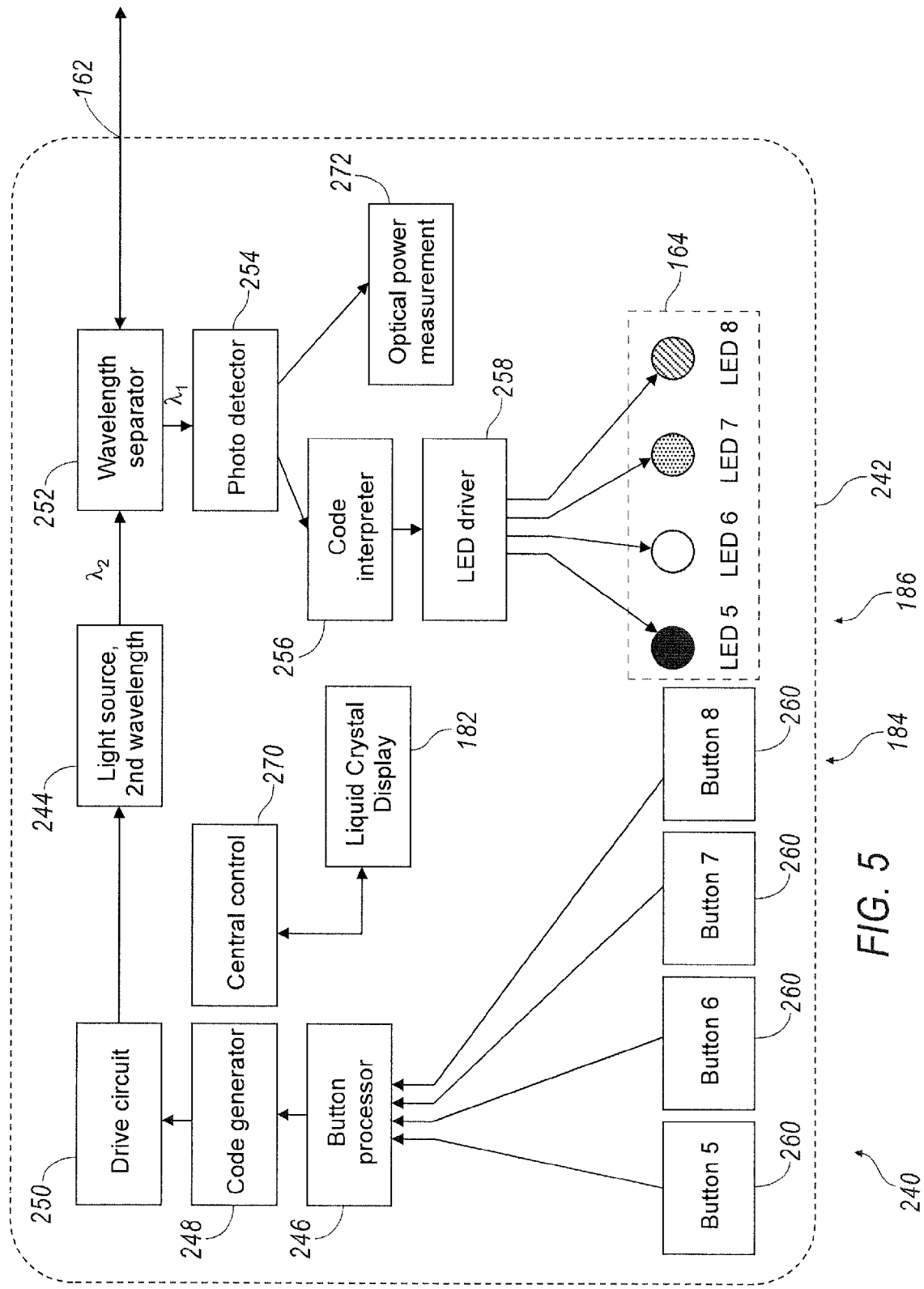
FIG. 5 illustrates an exemplary optical fiber power meter with a block flow diagram of exemplary internal components.
Figure 6:
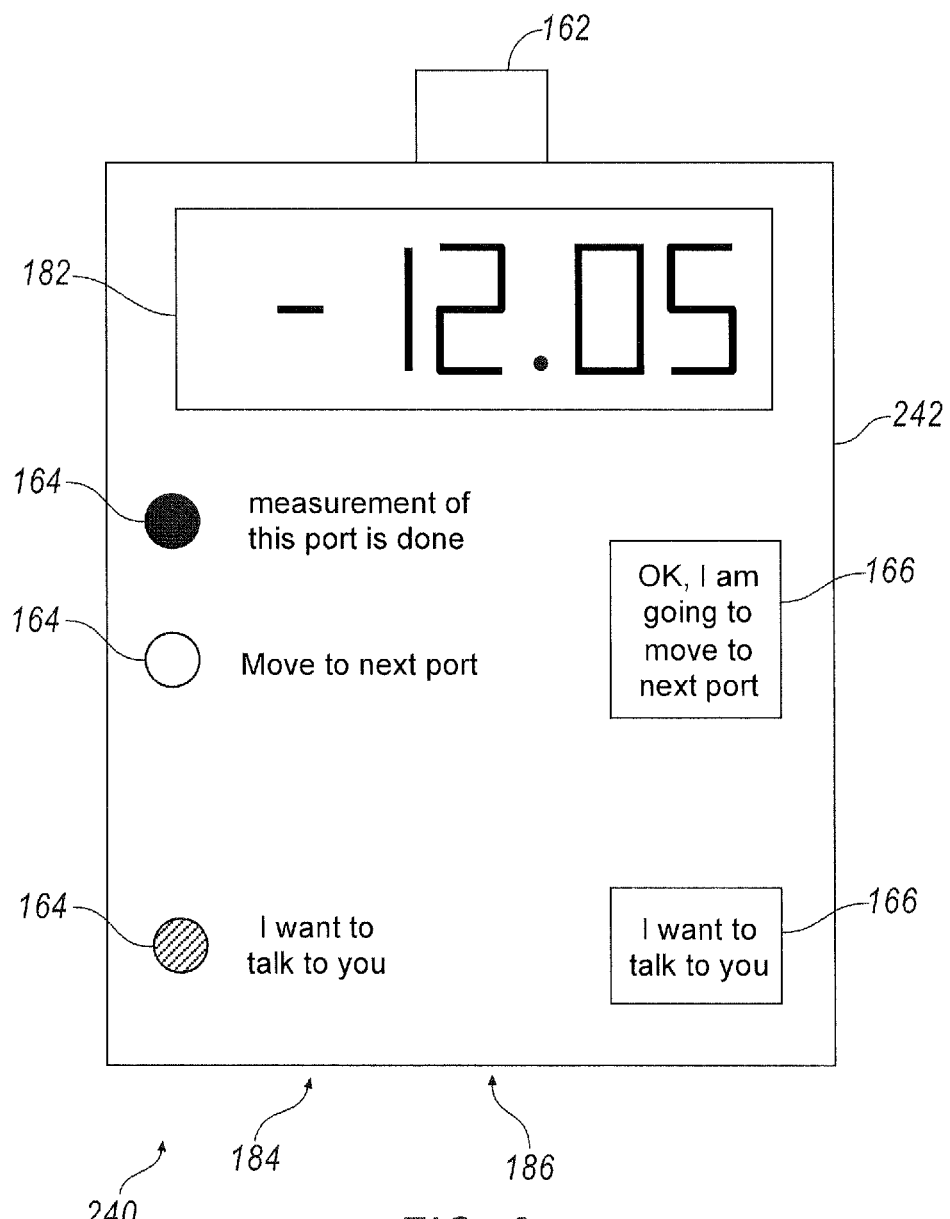
FIG. 6 illustrates an exemplary optical fiber power meter with textual display, communication buttons and indicators.
Figure 7:
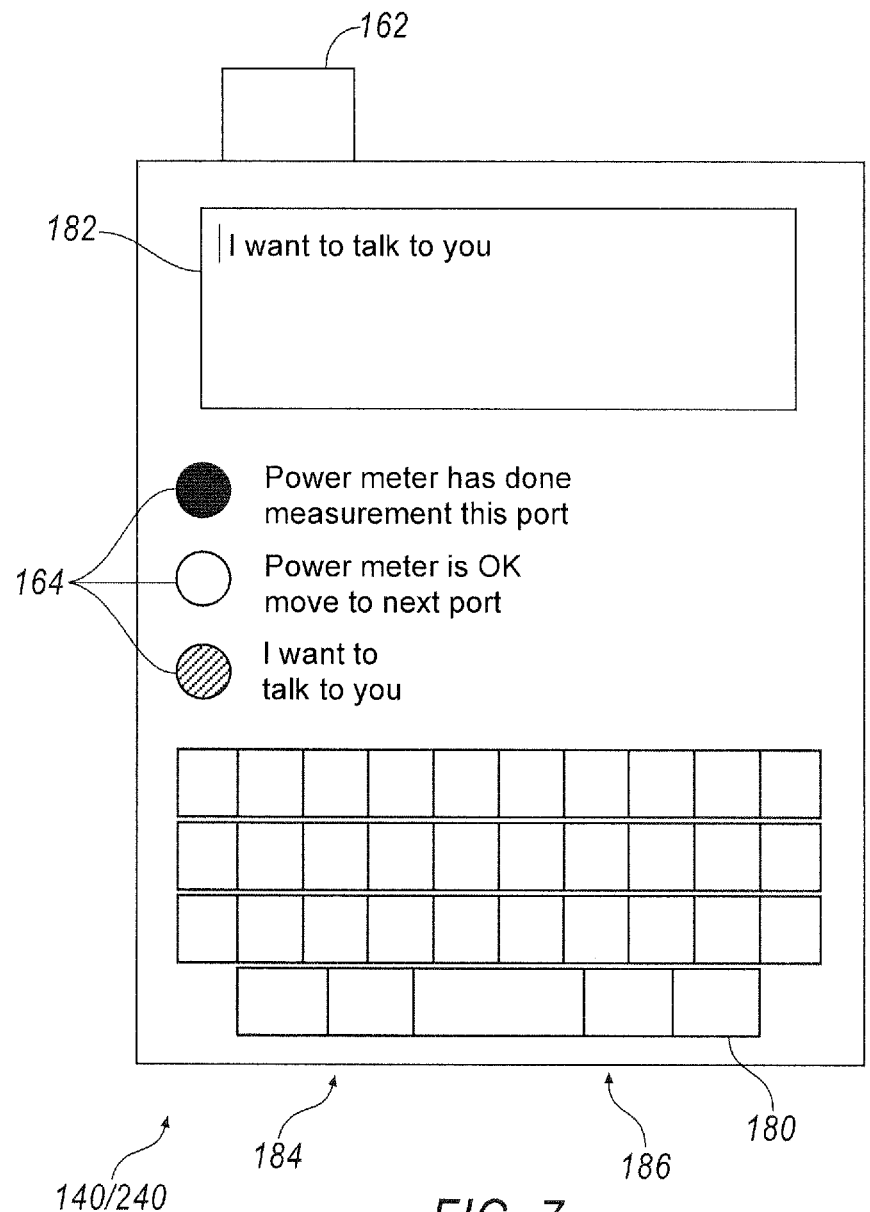
FIG. 7 illustrates an exemplary optical fiber power source or power meter with a textual input keyboard and function touch display.

As illustrated, in FIGS. 3 and 5 the exemplary power source 140 transmits the first wavelength from the light source 144 while the power meter 240 transmits the second wavelength from the light source 244. The light source 144, 244 may be a source for providing a beam of light to a wavelength separator 152. In turn, the wavelength separator 152 divides the light transmitted from the light source 144, 244 into at least one wavelength, such as the first or second wavelengths to provide a source for simultaneously measuring and communicating. The light source 140, 240 is capable of providing light that is divided into two separate wavelengths, a first wavelength for measuring and a second wavelength for testing. These two designations of first and second are merely used to distinguish the use of multiple wavelengths and is in no way limiting.

The exemplary measuring devices 140, 240 may include an on/off key (not shown), at least one function key that corresponds to the buttons 160, an input/output I/O port 186, such as a USB or other type port for communication between one of the measuring devices 140, 240 and a media storage device, such as, a computer (not shown). The I/O port provides a connection between the central control processor 170, 270 to allow the technician to automatically transfer the stored data in the power meter measuring device 240 to the media storage device either in a real-time mode or at a later date. The central control processor 170, 270 may be in communication with all of the internal components and controls the processing function of the exemplary measuring devices 140, 240. The central control processor 170, 270 may include the internal storage for retaining test data until it is off loaded to the media storage device. An exemplary power source 140 may include an auto mode (not shown) to automatically select or adjust the wavelength 144, 244. The wavelength 144, 244 may switch between continuous and modulated for use with all types of power meter measuring devices 240. Generally, the optical loss measured may be obtained by normalizing the measured power. Auto measurement by the power meter measuring device 240 itself may be provided to store the measured data in an automatic mode where the measured data is stored in the central control microprocessor's internal storage device until it is retrieved later.

The power source measuring device 140 and power meter measuring device 240 may include simple communication function buttons 166. These buttons 166 allow the technician to send a simple two-way communication with preprogrammed predetermined messages. This type of communication may include at least one communication function button 166 (illustrated in FIGS. 4, 6 and 7) to send a message, such as, but not limited to, "Begin Test," "Move to Next Port," "Bad Fiber," "I want to talk" and "Test Complete." The communication function buttons 166 may also include corresponding answer messages, such as, but not limited to, "Testing" and "Moved to Next Port." This provides the technicians with the flexibility to quickly and accurately work through testing the pre-selected media without losing two-way communication.

The power source measuring device 140 and the power meter measuring device 240 may also include more sophisticated communication features, such as, but not limited to, the inclusion of a keyboard 180, with a corresponding output screen 182 or touch screen, a two-way communication headset port 184, and an internal Bluetooth or wireless transceiver (not shown). The communication headset port 184 may include an input and an output for connecting at least one of the power source measuring device 140 and the power meter measuring device 240 to a common headset having a microphone and a speaker or other known headset type devices. The keyboard 180 allows the technicians to send textual messages as desired to provide more in-depth discussions verses the simple inputs discussed above. The Bluetooth feature allows the technician to wear a hands free communication headset (not shown), which provides greater flexibility and mobility when conducting tests.

In practice, the exemplary power source measuring device 140 and the power meter measuring device 240 may be preprogrammed with an exact location of a collection of optical fiber links 104 to be tested. The pre-programming may include an exemplary optical fiber link 104 map and sequence for the technicians to use such as codes for determining the exact location within an office, including an office code, a rack code, shelf code and port code. These pre-programmed inputs may be communicated between the power source measuring device 140 and the power meter measuring device 240 simultaneously while taking a power measurement. The power source measuring device 140 and the power meter measuring device 240 may also include an automatic "Com" feature that would automatically illuminate an indicator 164 or activate and display a predetermined code from the code generator 148 to inform the technician that there is a problem with the optical fiber link 104 that is currently being tested.

Figure 8:
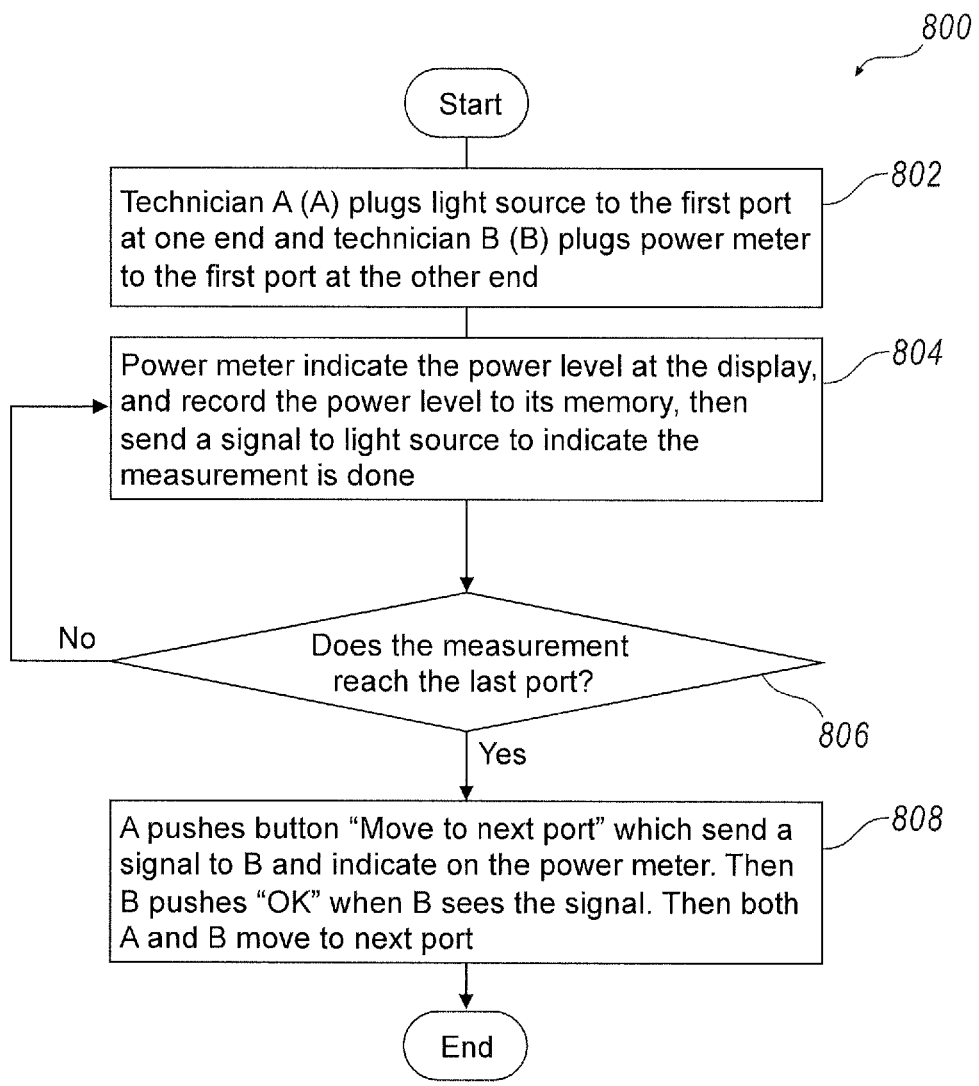
FIG. 8 illustrates an exemplary process.

Proceeding now to FIG. 8, an exemplary process 800 for measuring an optical loss while simultaneously communicating between a signal source measuring device 140 and a signal meter measuring device 240 is described. Process 800 may begin at block 802, where an exemplary communication system 100 is provided having at least one customer 106 connected to a central office 102 through at least one optical fiber link 104, which as discussed above may be an optical fiber link. The exemplary optical fiber link 104 may be interconnected to at least one component 108. A first technician (A) removably attaches the signal source measuring device 140 to a first test optical fiber link 104 directly or through a port in the component 108 at a first end. A second technician (B) removably attaches the signal meter measuring device 240 to the test optical fiber link 104 at a second end, opposite the first. The second end may also be directly attached to the optical fiber link 104 or through a port in the component 108. The signal source measuring device 140, as described above, may be configured for two-way communication and for transmitting a first light source wavelength through at least one removably connected optical fiber link 104. The signal meter measuring device 240, as described above, may be configured for two-way communication and for measuring the optical loss of the first wavelength while transmitting a second light wavelength through the same optical fiber link 104. The signal source measuring device 140 and the signal meter measuring device 240 may conduct the two-way communications simultaneously through at least one of the wavelengths while conducting a measurement test through the same optical fiber link 104.

Proceeding to block 804, where the signal meter measuring device 240 receives the wavelength and indicates a power level on the display 182. The technicians may conduct two-way communication through the optical fiber link 104, as discussed above, at any time before, during or after the test. Once the test is complete the signal meter measuring device 240 may either automatically send a message to the signal source measuring device 140, indicating that the test is complete or the technician may select one of the numerous communication methods, such as the simple communication buttons 166, which transmit a pre-programmed message through the two-way communications channel to the signal source measuring device 140. However, the two-way communications channel is not limited to just simple communications, such as the pre-programmed output. Instead, as discussed above, the two-way communications may be of any known sensory type of communication, such as, but not limited to auditory, visual and tactile through vibration, LED indicators, textual output, headset and microphone or video. These oral and tactile communication mechanisms listed should not be considered limiting and are merely exemplary types of communication.

In the instance where the test fails, the process will proceed to block 806, where the signal source measuring device 140 and the signal meter measuring device 240 detect a discontinuity in the form of no signal being transmitted or received through the optical fiber link 104. In the event that the optical fiber link 104 is broken and the test fails, the device may automatically send a pre-programmed message to the technician with directions to either proceed to a new optical fiber link 104 or to reconnect to the previous optical fiber link 104. This allows the technicians to reconnect the communications link to discuss or coordinate which optical fiber link 104 will be tested next or what the issues were with the previous optical fiber link 104 and decision may be made to proceed back to block 804.

However, if the test completes properly and the signal meter measuring device 240 sends the okay signal, then the process proceeds to block 808 where the technician (A) may select a simple communication button 160 to move to the next optical fiber link 104 for testing. Once the signal is sent, technician (B) will receive an indicator on the signal meter measuring device 240 and then may communicate a simple OK, which in turn may be indicated on the signal source measuring device 140. Upon receiving the okay, the process 800 repeats at block 802 with the next optical fiber.

In general, computing systems and/or devices, such as the power source measuring device 140, power meter measuring device 240 and a media storage device (not shown) may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system, such as one of those mentioned above, and are accessed via a network in any one or more of a variety of manners, as is known. A file system may be accessible from a computer operating system and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A system comprising:
a power source configured to generate a first optical wavelength to be used as both a measurement signal and a power source communication signal; and
a power meter in communication with said power source and configured to generate a second optical wavelength, and to receive said first optical wavelength as both said measurement signal and said power source communication signal;
wherein at least one of said power source and said power meter includes at least one input mechanism and a code generator interconnected to a processor, the processor determines an action as selected by said input mechanism, and said code generator selects a predetermined communication based on said selected action, the communication is at least one of transmitted and received through at least one fiber link.

2. A system as set forth in claim 1, wherein said first optical wavelength is used as both said measurement signal and said power source communication signal generally simultaneously.

3. A system as set forth in claim 1, wherein said power meter is configured to send said second optical wavelength as a power meter communication signal to said power source and said power source is configured to receive said second optical wavelength as said power meter communication signal.

4. A system as set forth in claim 1, wherein said power source and said power meter may be interchanged with each other.

5. A system as set forth in claim 1, wherein said power source is an optical light source and said power meter is an optical loss measurement device.

6. A system as set forth in claim 1, wherein said power source and said power meter are interconnected via at least one communication media.

7. A system as set forth in claim 6, wherein said communication media is an optical fiber link.

8. A system as set forth in claim 7, wherein said power source includes a wavelength separator and at least one output, wherein said wavelength separator separates said first optical wavelength from said second optical wavelength, and wherein said power source communication signal is directed to said at least one output.

9. A system as set forth in claim 1, wherein said first optical wavelength and said second optical wavelength are transmitted and received through a single optical fiber.

10. A system as set forth in claim 1, wherein said power meter measures said measurement signal automatically.

11. The system of claim 1, wherein said power meter is configured to generate a communication indicator when receiving the first optical wavelength as a power source communication signal.

12. A system comprising:
a transmitter having an optical light source providing a first optical wavelength to be used as both a measurement signal and a communication signal;
a receiver having an optical light source providing a second optical wavelength and configured to receive the first optical wavelength as both said first measurement signal and said communication signal, and a photo detector, an optical power measurement reader, and a code interpreter in communication with said first optical wavelength;
at least one wavelength separator, wherein said wavelength separator separates said first optical wavelength and said second optical wavelength; and
wherein said first optical wavelength is in communication with said optical power measurement reader when used as said measurement signal and is in communication with said code interpreter when used as said communication signal, wherein said code interpreter reads said communication signal and generates at least one preprogrammed message, and wherein said message is in communication with a predetermined output indicator.

13. A system as set forth in claim 12, further comprising at least one communication input mechanism.

14. A system as set forth in claim 12, wherein said transmitter transmits said first optical wavelength as at least one of said communication signal and said measurement signal and wherein said receiver receives said first optical wavelength as at least one of said communication signal and said measurement signal.

15. A system as set forth in claim 12, wherein at least one of said transmitter and said receiver includes at least one input mechanism interconnected to a processor, the processor determines an action as selected by said input mechanism, a code generator interconnected to said processor, wherein the code generator selects a predetermined communication, the communication is at least one of transmitted and received through at least one fiber link.

16. A system as set forth in claim 12, wherein the optical light source of the transmitter and the optical light source of the receiver are configured to at least generally simultaneously generate said first wavelength and said second wavelength, respectively, at least one of said transmitter and said receiver further including a communication indicator, said communication indicator being activated when said first wavelength is used as said communication signal.

17. A method comprising:
  generating a first optical wavelength from a power source, said first optical wavelength to be used as at least one of a measurement signal and a power source communication signal, said power source including an input mechanism and a code generator interconnected to a processor;
  receiving said first optical wavelength at a power meter as said measurement signal and said power source communication signal, wherein said power meter is in communication with said power source, said power meter including a photo detector, an optical power measurement reader, and a code interpreter in communication with said first optical wavelength;
  wherein said processor determines an action as selected by said input mechanism, and said code generator selects a predetermined communication based on said selected action, said predetermined communication being transmitted through at least one fiber link; and
  wherein said first optical wavelength is in communication with said optical power measurement reader when used as said measurement signal and is in communication with said code interpreter when used as said communication signal, wherein said code interpreter reads said predetermined communication and generates at least one preprogrammed message, and wherein said message is in communication with a predetermined output indicator.

18. A method as set forth in claim 17, further comprising:
  separating at said power meter via at least one wavelength separator at least one of the first optical wavelength and a second optical wavelength generated by said power meter.

19. A method as set forth in claim 17, further comprising:
  measuring a power level of said first optical wavelength used as a measurement signal; and
  storing said measured power level to at least one of an internal data storage device and an external data storage device.

20. A method as set forth in claim 17, further comprising:
  generating at least one preprogrammed response; and
  transmitting the at least one preprogrammed response, wherein the response is transmitted to at least one of, a light emitting diode (LED) indicator, a textual display screen, a speaker and a tactile vibration.

21. A method as set forth in claim 20, wherein the transmitting of the at least one preprogrammed response is at least one of automatic and manual.

22. A method as set forth in claim 17, further comprising generating at least one of a textual message and a verbal discussion through at least one of a tactile input mechanism and an oral communication mechanism.

23. A method as set forth in claim 17, further comprising using said first optical wavelength as the measurement signal and the power source communication signal at least generally simultaneously.

\* \* \* \* \*